United States Patent
Lin

[19]

[11] Patent Number: 6,092,262
[45] Date of Patent: Jul. 25, 2000

[54] NON-SKID WHEEL BRAKE MECHANISM

[76] Inventor: Arthur Lin, 62 Hsiao-Pei Street, She-Lin District, Taipei, Taiwan

[21] Appl. No.: 09/235,165

[22] Filed: Jan. 22, 1999

[51] Int. Cl.[7] ........................................... B60B 33/00
[52] U.S. Cl. .................. 16/35 R; 16/19; 16/44; 16/45; 16/46; 188/1.12; 267/165
[58] Field of Search ................ 188/1.12; 267/165; 16/35 R, 44, 19, 45, 46

[56] References Cited

U.S. PATENT DOCUMENTS

| | | | |
|---|---|---|---|
| 4,455,707 | 6/1994 | Screen | 16/35 R |
| 4,821,369 | 4/1989 | Daniels | 188/1.12 |
| 5,014,391 | 5/1991 | Schulte | 16/35 R |
| 5,617,934 | 4/1997 | Yang | 188/1.12 |

*Primary Examiner*—S. Joseph Morano
*Assistant Examiner*—Jason R. Bellinger
*Attorney, Agent, or Firm*—Bacon & Thomas, PLLC

[57] ABSTRACT

A non-skid wheel brake mechanism includes a wheel body, a shaft part, left and right wheels each with a ring rim. The device includes an outer rim having an oval ring groove having upper and lower half portions. A substantially oval shaped shaft bore extends through the outer rim. A rim bore extends vertically through the outer rim to form an accommodating channel. The accommodating channel is in communication with the shaft bore. The ends of the wheel shaft is secured within the insert bores of the ring rims. An S-shaped spring plate is positioned inside the accommodating channel and extends into the shaft bore against the wheel shaft such that the ring rims are frictionally braked by the lower half portion of the oval ring groove. When the S-shaped spring plate is compressed further against the wheel shaft, the ring rims of the wheels move between the lower and upper half portions of the oval ring groove and are no longer in frictional contact with lower portion of the oval ring groove, thereby permitting rotation of the wheels.

1 Claim, 5 Drawing Sheets

NON-SKID WHEEL BRAKE MECHANISM

BACKGROUND OF INVENTION

1. Field of the Invention

This invention relates to a "non-skid wheel brake mechanism", particularly to one with the employment of a spring plate to check the rotation of a wheel shaft 2. Description of the Prior Art It is generally preferred that a chair not be allowed to move or slide when no one is sitting on it. The purpose is to prevent sudden movement of the chair once a child has climbed onto it, because a moving chair may cause injury to the child, or continuous movement of the chair once occupied. A pulley is composed of a wheel body 1, a wheel shaft 2, a left wheel 3, a right wheel 4 and an elbow shaft. The wheel body comprises a body part 10 in the shape of a block, the top side of the body part is an arc cover part, at the rear of the arch cover part is a shaft that is connected with an upper shaft. In the body part 10 there is a shaft hole 13, the shaft hole 13 receives the wheel shaft 2, the two ends of the wheel shaft 2 are respectively inserted in the insert holes of the left wheel 3 and the right wheel 4 inside of the wheel. The wheel shaft and the left and right wheels are in a status of free rotation. As shown in FIG. 5, the design shows the employment of a spring 17 and a wheel seat 13 that is separated from the body part, wherein the wheel seat comprises a shaft hole, so that the wheel seat becomes a floating type. The lower portion of the spring 17 is positioned in a spring housing bore 18. There is an extension of a stop plate 19 from the lower part of the arc cover part of the body part. When the spring is not subjected to pressure, the plates at two sides of the spring plate are tightly pressing against the inside edge of the two wheels, braking the rolling of two wheels, only when the chair is subjected to force, i.e., weight of occupant the spring will be compressed, the engagement will be released.

SUMMARY OF THE INVENTION

The primary objective of the present invention is to present a non-skid wheel brake mechanism, whereby the wheel will not move when it is not occupied (not subjected to pressure), the device is to a direct control type mechanism whereby the wheel will not move unless it is subjected to a vertical force.

To achieve the above objective, this invention comprises a wheel body, a wheel shaft, a left wheel, a right wheel and an upper shaft. The wheel body comprises a body part in the shape of a block, the top side of the body part is an arc cover part. At the rear of the arc cover part is a shaft which is connected with the upper shaft. In the body part is a shaft hole, the shaft hole receives the wheel shaft, two ends of the wheel shaft are respectively inserted to the insert holes of the left wheel and the right wheel on the inside of the wheel, the shaft hole of the wheel body part being slightly expanded to form a small oval shape, at the bottom side of the shaft hole is a hole that penetrates from the bottom side of the body part to the top side of the shaft hole, to form an accommodating groove. Inside the accommodating groove is an S-shaped spring plate, enabling the surface the lower part of the extended spring plate to press on the wheel shaft, with a ring rim beside the insert hole of two wheels that is inserted to the outer edge of the shaft hole of the wheel body. The lower part of an oval ring grove with a larger top part and a smaller bottom part, so that the ring rim with a smaller diameter is caught inside the lower half part of oval ring groove, only when the wheel body is pressed to move down, the spring plate will retract, then the ring rim of the two wheels will move to the upper half part oval ring groove of the wheel body, then the wheel shaft and the two wheels will be able to rotate. The spring plate is shaped to have a larger top part and a smaller bottom part.

BRIEF DESCRIPTION OF THE DRAWINGS

To enable better understanding of the features and advantages of the present invention, the following preferred embodiments of the invention are described as examples only, without any limitative character, with reference to the accompanying drawings, in which.

DETAILED DESCRIPTION OF THE PREFERRED EMBODIMENT

Figure 1:
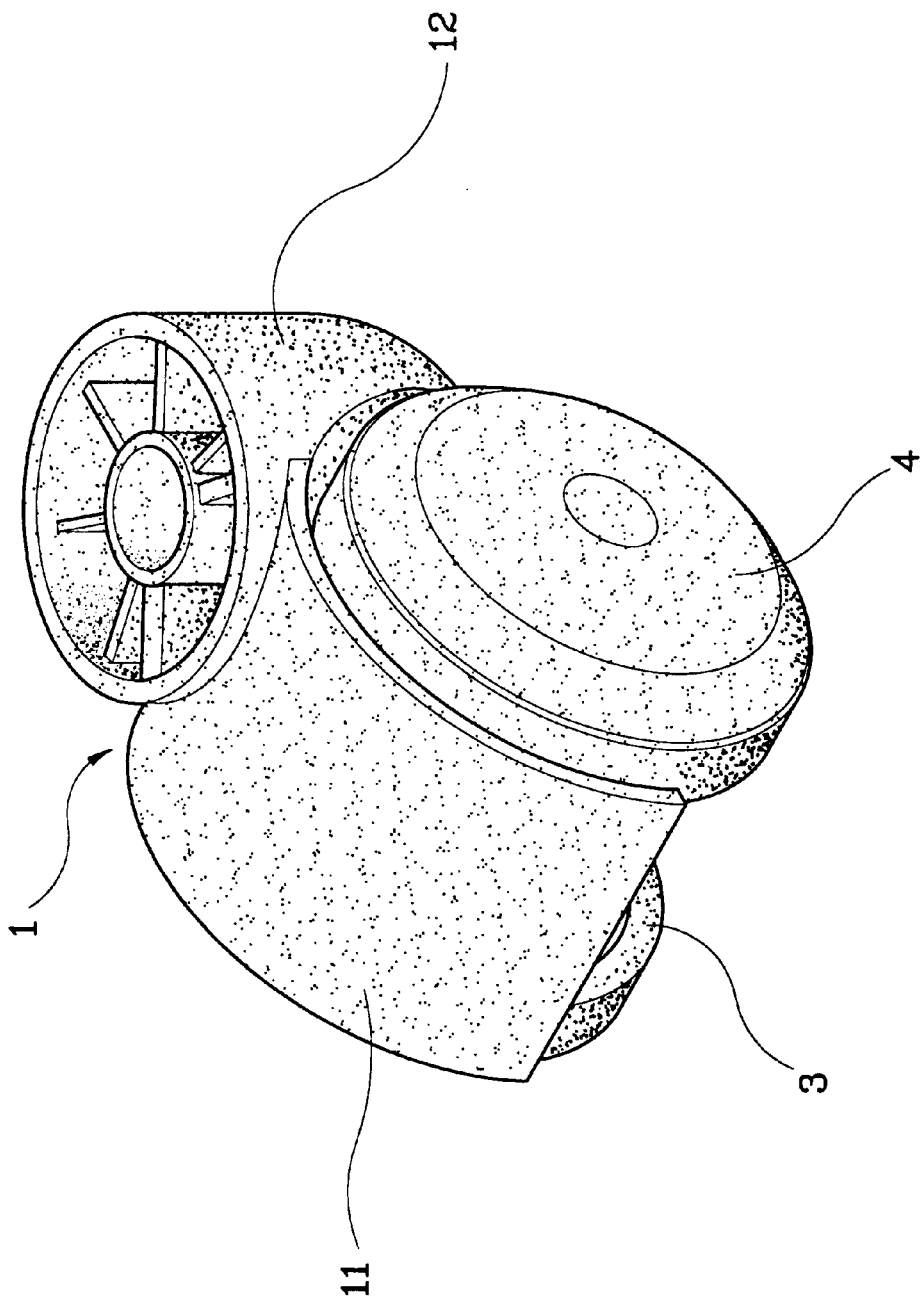
FIG. 1 is a perspective assembled view of the invention.
Figure 2:
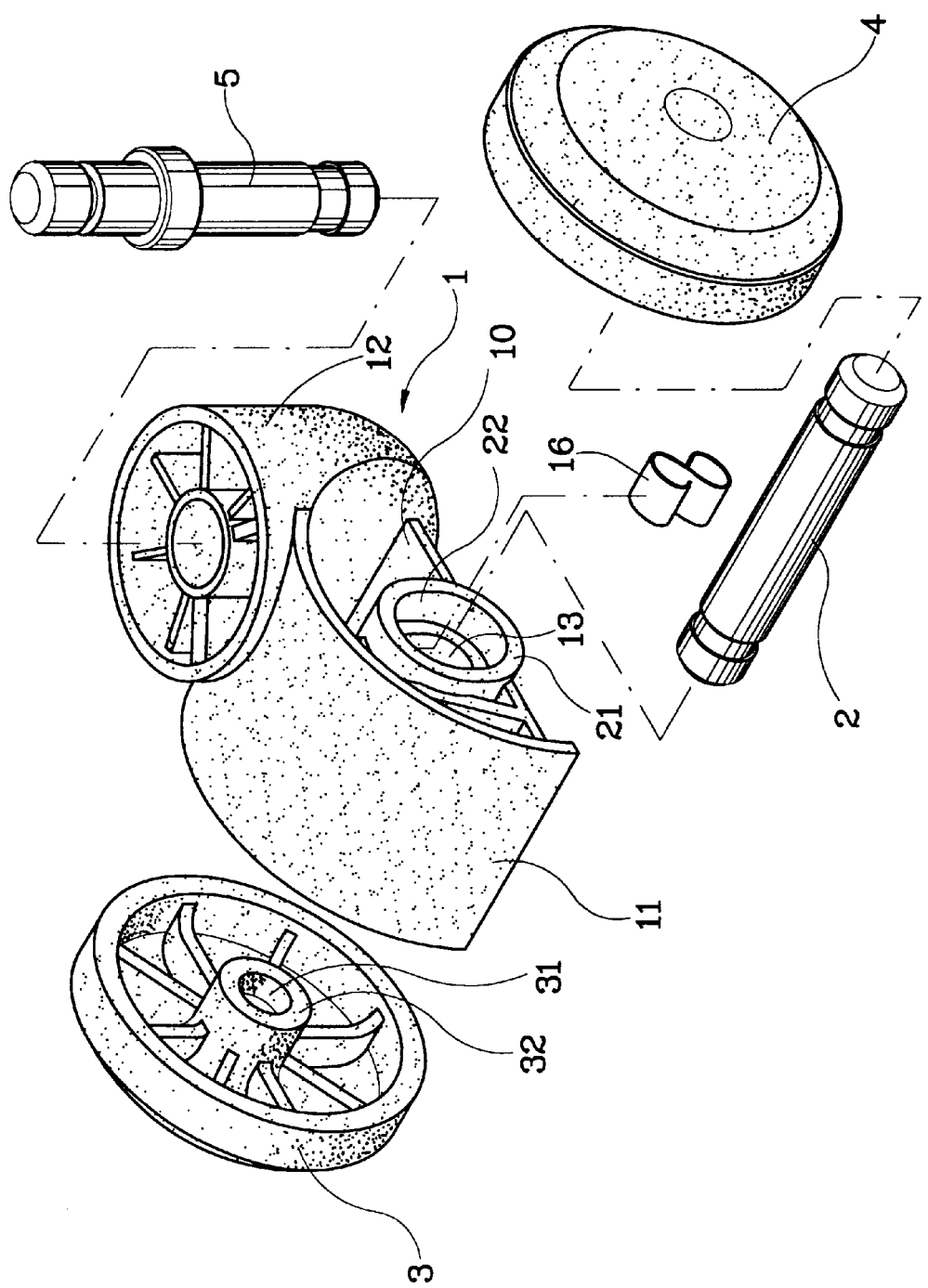
FIG. 2 is an exploded view of the invention.
Figure 3:
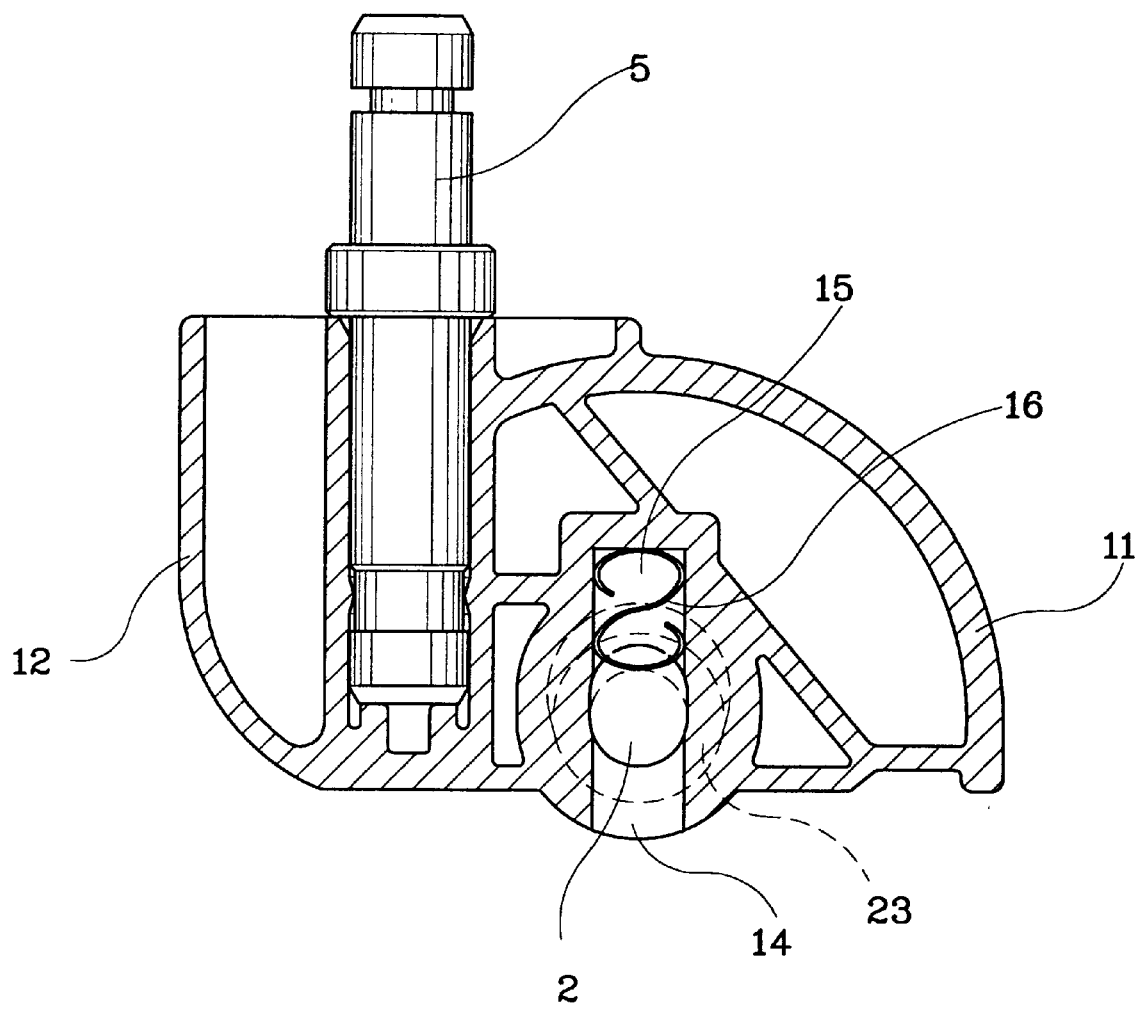
FIG. 3 is a side view, partly in section.
Figure 4:
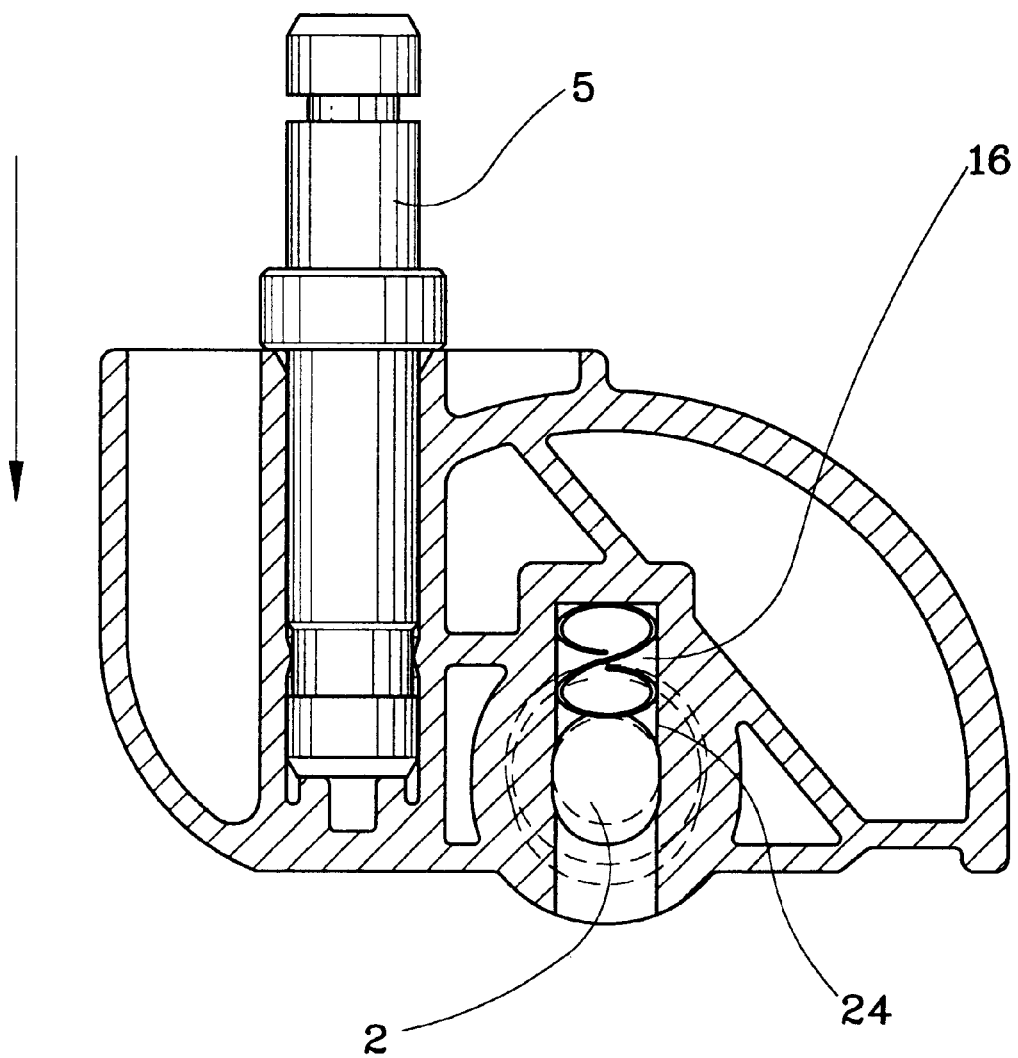
FIG. 4 is a side view, partly in section.
Figure 5:
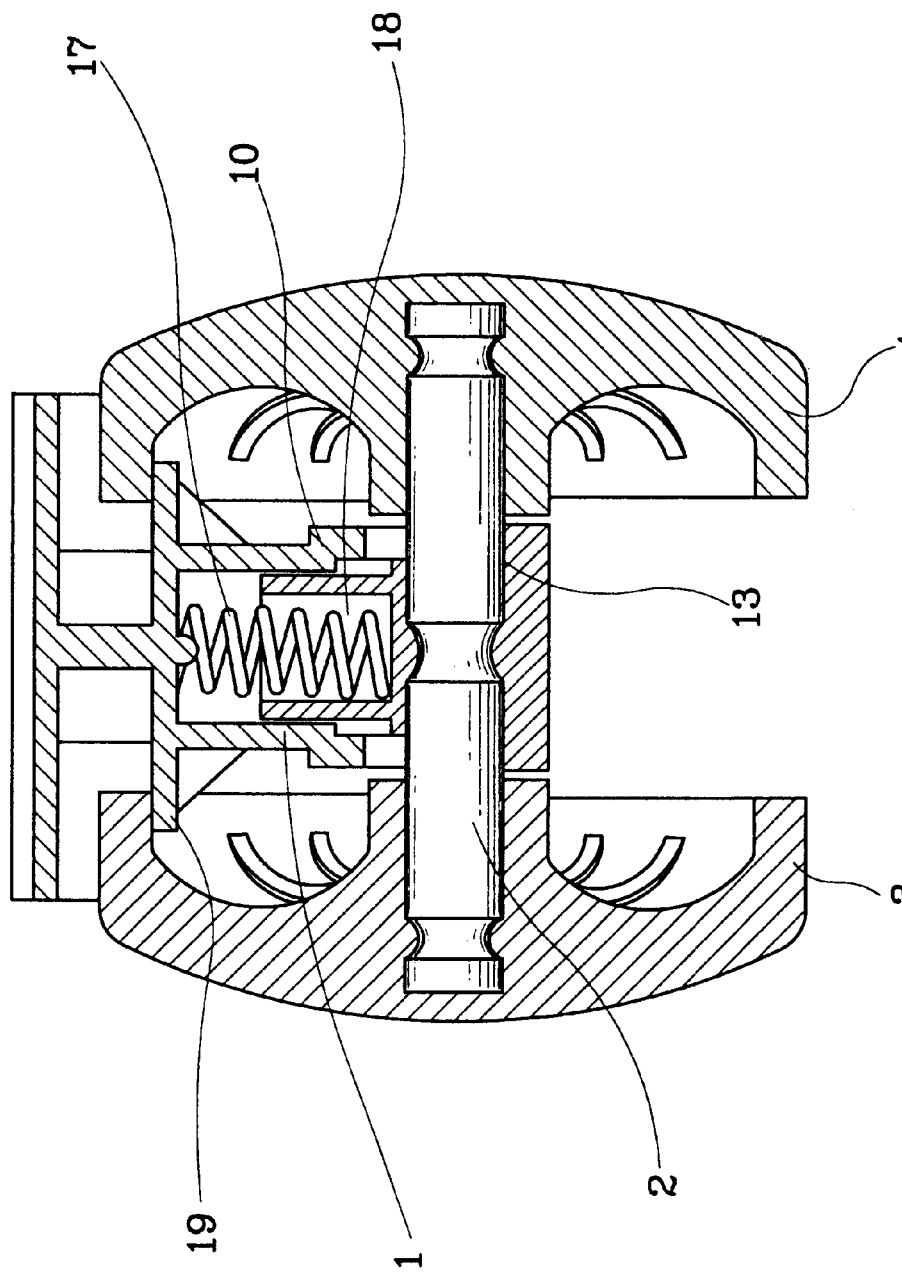
FIG. 5 is a side view, of a prior art before operation.

This invention relates to a "non-skid wheel brake mechanism", as shown in FIGS. 1 to 4, comprising a wheel body 1, a wheel shaft 2, a left wheel 3, a right wheel 4 and an upper shaft 5, the wheel body 1 comprising a body 10 in the shape of a block. On the top side of the body 10 is an arc cover part 11. At the rear of the arch cover part 11 is a shaft part 12 in connection with an upper shaft 5, in the body 10 is a shaft hole 13, the shaft hole 13 enabling the penetration of the wheel shaft 2. Two ends of the wheel shaft 2 are respectively inserted to the insert holes 31 of the left wheel 3 and the right wheel 4 at the inside of the wheel, wherein the shaft hole 13 of the body 10 of the wheel body 1 is slightly expanded to form a small oval. At the bottom side of the shaft hole of the small oval is a hole 14 penetrating from the bottom of the body 10 to the top side of the shaft hole 13, to form an accommodating channel 15. In the accommodating channel 15 is an S-shaped spring plate 16, which enables the side near the bottom end of the extended spring plate 16 to be pressed against the wheel shaft 2, so that the wheel shaft 2 is caught in a stable position, meanwhile a ring rim 32 beside the insert hole 31 of the two wheels 3, 4 is inserted in the lower half oval ring groove 23 between the outer rim 21 at two sides of the shaft hole 13 of the wheel body 1 and the lower half oval ring groove 23, so that the ring rim 32 with an outer diameter smaller than the lower half oval ring groove 23 is caught inside the lower half oval ring groove. The outer rim 21 is oval in shape with a substantially vertical major axis and a substantially horizontal minor axis only when the wheel body 1 is depressed to move down, (i.e., by a force as represented by the vertical arrow shown in FIG. 4) the spring plate 16 will compress, then the wheel shaft 2 moves to the oval ring groove 24 at the upper half of the oval ring rim 22. The oval ring groove 24 is shaped to have a larger top part and a smaller bottom part, since the inner diameter of the upper half oval ring groove 24 is slightly larger than the outer diameter of the ring rim 32, so the wheel shaft 2 and the two wheels 3,4 will be able to rotate. Therefore rotate, only when the wheel body 1 is depressed to move down, the spring plate 16 will retract, then the wheel shaft 2 will rotate, wherein the spring plate 16 is shaped to have a larger upper end and a smaller lower end. For example, the distance of retraction and movement of the spring plate 16 upon depression can be 2 mm, this is the position of the shaft hole 13 forming the oval hole from the round hole, in other words, it is the change in position where the ring rim 32 of the two wheels 3,4 is in contact with the lower half circle of the shaft hole 13 from the bottom side to the status where the top half side is in contact with the upper half circle of the shaft hole 13. Then, while the spring plate 16 is still pressing on the wheel shaft, it is retracted into the accommodating channel 15, allowing the rotation of the wheel shaft 2, in other words, the wheel shaft 2 will not be able to rotate without a sufficient vertical force to eliminate the resistance produced by the spring plate 16.

As described above, the main performance of the invention lies in the employment of the effect of the spring plate with a powerful pressing force, when the spring plate is extended into the fixing groove, pressing on the apex of the wheel shaft, so when the wheel shaft is not subjected to a sufficient force, the ring rim of the wheel is accommodated in a reduced oval ring groove, and is braked there. Only when there is someone sitting on the chair, will there be sufficient force to force the spring plate to be retracted in the accommodating groove, and the wheel body will drop , the ring rim of the wheel moves to the oval ring groove with a clearance, then the wheel shaft will be able to rotate freely. When the person sitting on the chair gets off the chair the checking roller will move freely. Thus the invention achieves its objectives with simplified construction, in which of a accomplishes the required functions, so it is more simplified and convenient than a conventional prior design. In addition, the spring plate has a better flexible function than a spring to last longer.

The above description covers only the preferred embodiment of the invention, which should not be based to limit or restrict the characteristics of the invention, all equivalent modifications easily conceivable to anyone skilled in the art shall be included in the intent and scope of the subject claims.

What is claimed is:

1. A non-skid wheel brake mechanism, comprising:

a wheel body (1) including a shaft part (12), a body (10), and an arched cover part (11) that covers the body (10) and is arched toward and connected to the shaft part (12), an outer rim (21) having an oval ring groove (24), the oval ring groove (24) having upper and lower half portions;

a shaft bore (13) extending through the oval ring groove (24) of the outer rim (21), the shaft bore (13) having a substantially oval shape;

a rim bore (14) extending substantially vertically through the outer rim (21) to form an accommodating channel (15), the accommodating channel (15) in communication with the shaft bore (13);

a wheel shaft (2) having two ends extending through the shaft bore (13);

left and right wheels (3,4) each having a ring rim (32) surrounding an insert bore (31), the ends of the wheel shaft (2) secured within the insert bores (31) of the ring rims (32);

an upper shaft (5) secured in the shaft part (12); and an S-shaped spring plate positioned inside the accommodating channel (15) and extending towards the shaft bore (13) forced against the wheel shaft (2) such that the ring rims (32) are frictionally braked by the lower half portion of the oval ring groove (24), when the S-shaped spring plate is further compressed by an applied weight against the wheel shaft (2), the ring rims (32) of the wheels (3, 4) move between the lower and upper half portions of the oval ring groove (24) and are not in frictional contact with lower half portion of the oval ring groove (24) thereby permitting the rotation of the wheels (3, 4).

* * * * *